United States Patent [19]
Watanabe et al.

[11] Patent Number: 5,903,381
[45] Date of Patent: May 11, 1999

[54] PLASMA ADDRESSED ELECTRO-OPTICAL DISPLAY DEVICE

[75] Inventors: Shinji Watanabe; Tetsuya Morita, both of Kanagawa; Kazunao Oniki, Tokyo, all of Japan

[73] Assignee: Sony Corporation, Tokyo, Japan

[21] Appl. No.: 08/916,744

[22] Filed: Aug. 19, 1997

[30] Foreign Application Priority Data

Aug. 22, 1996 [JP] Japan ............................. P08-221617

[51] Int. Cl.⁶ .................................................. G02F 1/03
[52] U.S. Cl. ...................................... 359/254; 359/252
[58] Field of Search ................................ 359/252–256

[56] References Cited

U.S. PATENT DOCUMENTS

| | | | |
|---|---|---|---|
| 4,896,149 | 1/1990 | Buzak et al. | 340/794 |
| 5,077,553 | 12/1991 | Buzak | 340/744 |
| 5,272,472 | 12/1993 | Buzak | 345/60 |
| 5,672,208 | 9/1997 | Morita | 118/723 |
| 5,684,362 | 11/1997 | Togawa | 313/582 |
| 5,696,523 | 12/1997 | Yano | 345/60 |

FOREIGN PATENT DOCUMENTS 1-217396  8/1989  Japan.
5-297359  11/1993  Japan.

*Primary Examiner*—Georgia Epps
*Assistant Examiner*—Suzanne Letendre
*Attorney, Agent, or Firm*—Hill & Simpson

[57] ABSTRACT

A plasma addressed electro-optical display device having a plasma cell comprising an anode electrode and a cathode electrode arranged in parallel in a plasma chamber in which a discharge is performed and a liquid crystal cell arranged near the plasma chamber and driven through a virtual electrode formed in the region discharged in the plasma cell, wherein as the discharge gas sealed in the plasma chamber, use is made of one of the group of approximately 100 percent by volume of xenon (Xe); approximately 100 percent by volume of krypton (Kr); a mixed gas of xenon (Xe) and an inert gas other than xenon (Xe) or a stable gas; and a mixed gas of krypton (Kr) and an inert gas other than krypton (Kr) or a stable gas.

6 Claims, 9 Drawing Sheets

EXAMPLE OF CONFIGURATION OF PLASMA ADDRESSED LIQUID CRYSTAL DISPLAY DEVICE

EXAMPLE OF CONFIGURATION OF PLASMA ADDRESSED LIQUID CRYSTAL DISPLAY DEVICE

ARRANGEMENT OF DATA ELECTRODES, PLASMA ELECTRODES, AND DISCHARGE CHANNELS

CIRCUIT CONFIGURATION OF PLASMA ADDRESSED LIQUID CRYSTAL DISPLAY DEVICE

PLASMA ADDRESSED ELECTRO-OPTICAL DISPLAY DEVICE

BACKGROUND OF THE INVENTION

1. Field of the Invention

The present invention relates to a plasma addressed electro-optical display device having its characterizing feature in the gas sealed in the plasma chamber.

2. Description of the Related Art

In the past, matrix type electro-optical devices, for example, liquid crystal display devices, using liquid crystal cells as the electro-optical cells have been known. To make these liquid crystal display devices higher in resolution and higher in contrast, active matrix type liquid crystal display devices have been developed in which thin film transistors and other switching elements are provided at each pixel and these are linearly successively driven.

In this case, however, it is necessary to provide a large number of thin film transistor like semiconductor elements on the substrate. In particular, there is the shortcoming that the manufacturing yield at the time the area is made larger becomes poorer.

Therefore, recently, a plasma addressed liquid crystal display device (PALC) where the electro-optical cells are driven using switches based on plasma discharge instead of switching elements comprised of thin film transistors etc. has been proposed (see for example Japanese Unexamined Patent Publication (Kokai) No. 1-217396, Japanese Unexamined Patent Publication (Kokai) No. 5-297359, etc.)

Such a plasma addressed liquid crystal display device has a display cell as represented by a liquid crystal display cell and a plasma cell arranged near to the same and comprised of a plasma chamber of a discharge region having plasma electrodes formed in a stripe in the columnar direction. The display cell is driven for each pixel by a virtual electrode based on the region discharged in the plasma cell and a transparent electrode arranged perpendicular to the same.

In the past, as the discharge gas sealed in such a plasma chamber, use was made of a pure gas or mixed gas comprised mainly of helium (He) or neon (Ne) gas from the viewpoint of lowering the discharge voltage (Vf).

However, in the plasma addressed liquid crystal display device of the related art explained above, the plasma decay time was long and there was the problem that it was not possible to write by a quick scan.

Further, in the above plasma addressed liquid crystal display device of the related art, the transmittance deteriorated quickly due to the sputtering of the electrode material during the discharge. Further, it suffers from the disadvantage of an abnormal discharge (ultrasmall arc discharge) along with time and a shorter panel life.

Also, in the plasma addressed liquid crystal display device of the related art, it also suffers from the disadvantage of a large discharge current (density) and the operating temperature.

SUMMARY OF THE INVENTION

An object of the present invention is to provide a plasma addressed electro-optical display device having a short decay time and a long life.

The present inventors engaged in intensive studies to overcome the disadvantages of the product life and deterioration of properties due to the discharge gas in a plasma addressed electro-optical display device and as a result discovered that if use was made of a pure gas of xenon (Xe) or krypton (Kr) or a mixed gas of xenon and/or krypton in a specific ratio as the discharge gas, it would be possible to provide a plasma addressed electro-optical display device with a stabler operating voltage of the discharge compared with the case of use of the conventionally used He family or Ne family discharge gas, a smaller discharge voltage and change in the transmittance along with time, a longer life, and a shorter plasma decay time and thereby completed the present invention.

According to a first aspect of the present invention, there is provided a plasma addressed electro-optical display device comprising: a first substrate having a plurality of first electrodes provided on a transparent electrode; a second substrate having a plurality of second electrodes extending perpendicularly to the said first electrodes and disposed with the second electrodes facing the first electrodes; a third substrate provided between the first and second substrates; an electro-optical layer provided between the potential setting sheet and second substrate; a plasma cell formed between the electro-optical layer and said first substrate; and an ionizable gas sealed in the discharge space, said ionizable gas comprising 100 percent by volume of xenon.

Preferably, when the pressure of the ionizable gas is P and the distance between the adjoining discharge electrodes is d, the expression (1) is satisfied:

$$0.2 \leq P \cdot d \leq 3.0 (Pa \cdot m) \tag{1}$$

According to a second aspect of the present invention, there is provided a plasma addressed electro-optical display device comprising: a first substrate having a plurality of first electrodes provided on a transparent electrode; a second substrate having a plurality of second electrodes extending perpendicularly to the said first electrodes and disposed with the second electrodes facing the first electrodes; a third substrate provided between the first and second substrates; an electro-optical layer provided between the potential setting sheet and second substrate; a plasma cell formed between the electro-optical layer and said first substrate; and an ionizable gas sealed in the discharge space, said ionizable gas comprising xenon and an inert gas or a stable gas.

Preferably, when the pressure of the xenon is P and the distance between the adjoining discharge electrodes is d, the expression (2) is satisfied:

$$0.02 \leq P \cdot d \leq 3.0 (Pa \cdot m) \tag{2}$$

According to a third aspect of the present invention, there is provided a plasma addressed electro-optical display device comprising: a first substrate having a plurality of first electrodes provided on a transparent electrode; a second substrate having a plurality of second electrodes extending perpendicularly to the first electrodes and disposed with the second electrodes facing the first electrodes; a third substrate provided between the first and second substrates; an electro-optical layer provided between the potential setting sheet and second substrate; a plasma cell formed between the electro-optical layer and said first substrate; and an ionizable gas sealed in the discharge space, said ionizable gas comprising 100 percent by volume of krypton.

Preferably, when the pressure of the ionizable gas is P and the distance between the adjoining discharge electrodes is d, the expression (3) is satisfied:

$$0.2 \leq P \cdot d \leq 3.0 (Pa \cdot m) \tag{3}$$

According to a fourth aspect of the present invention, there is provided a plasma addressed electro-optical display device comprising: a first substrate having a plurality of first electrodes provided on a transparent electrode; a second substrate having a plurality of second electrodes extending perpendicularly to the first electrodes and disposed with the second electrodes facing the first electrodes; a third substrate provided between the first and second substrates; an electro-optical layer provided between the potential setting sheet and second substrate; a plasma cell formed between the electro-optical layer and said first substrate; and an ionizable gas sealed in the discharge space, the ionizable gas comprising krypton and an inert gas or a stable gas.

Preferably, when the pressure of the krypton gas is P and the distance between the adjoining discharge electrodes is d, the expression (4) is satisfied:

$$0.02 \leq P \cdot d \leq 3.0 (Pa \cdot m) \quad (4)$$

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

The plasma addressed liquid crystal display device according to the embodiments of the present invention will be explained below.

Figure 1:
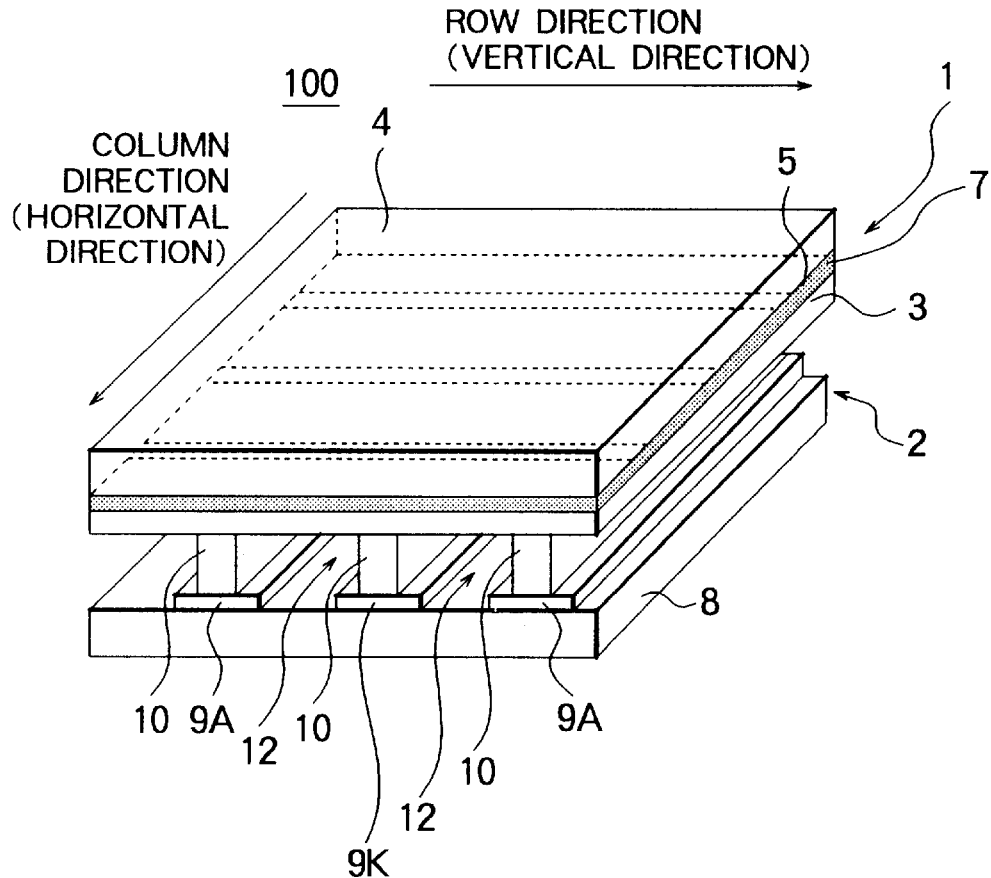
FIG. 1 is a schematic perspective view of principle parts showing an example of the configuration of the plasma addressed liquid crystal display device.
Figure 2:
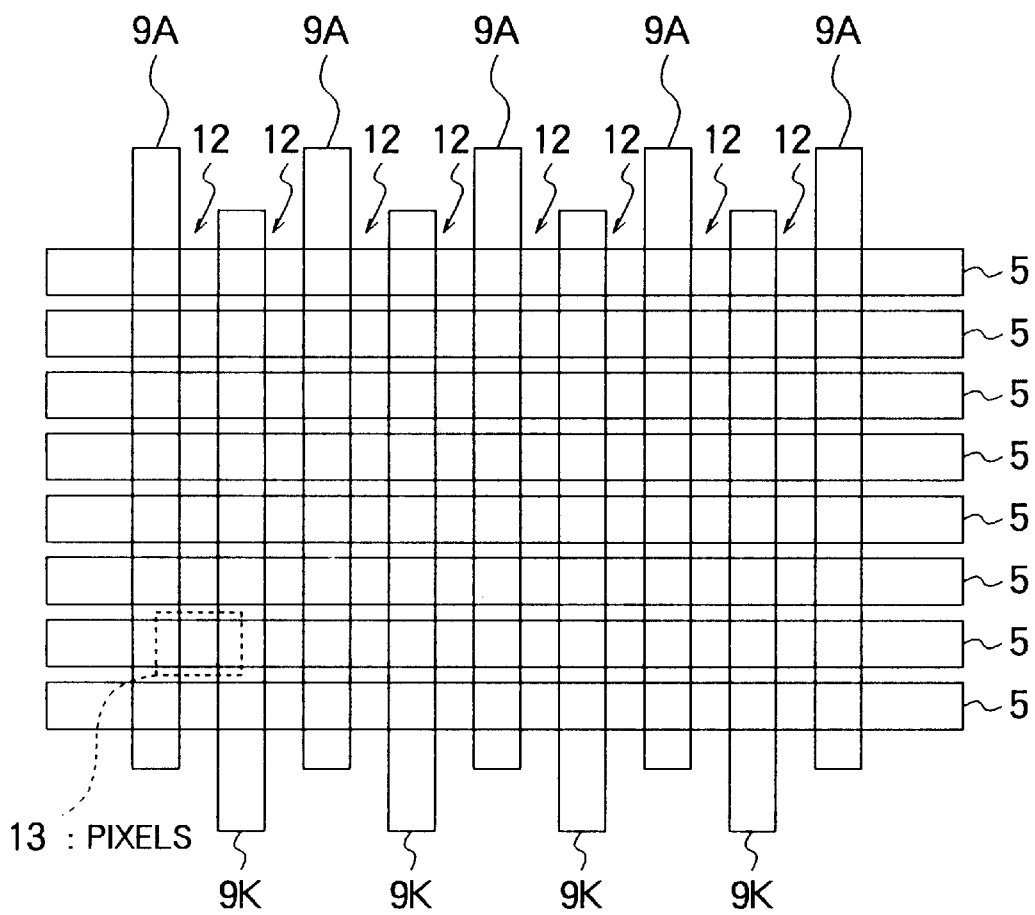
FIG. 2 is a view of the arrangement of the data electrode, plasma electrode, and plasma chamber of a plasma addressed liquid crystal display device shown in FIG. 1.
Figure 3:
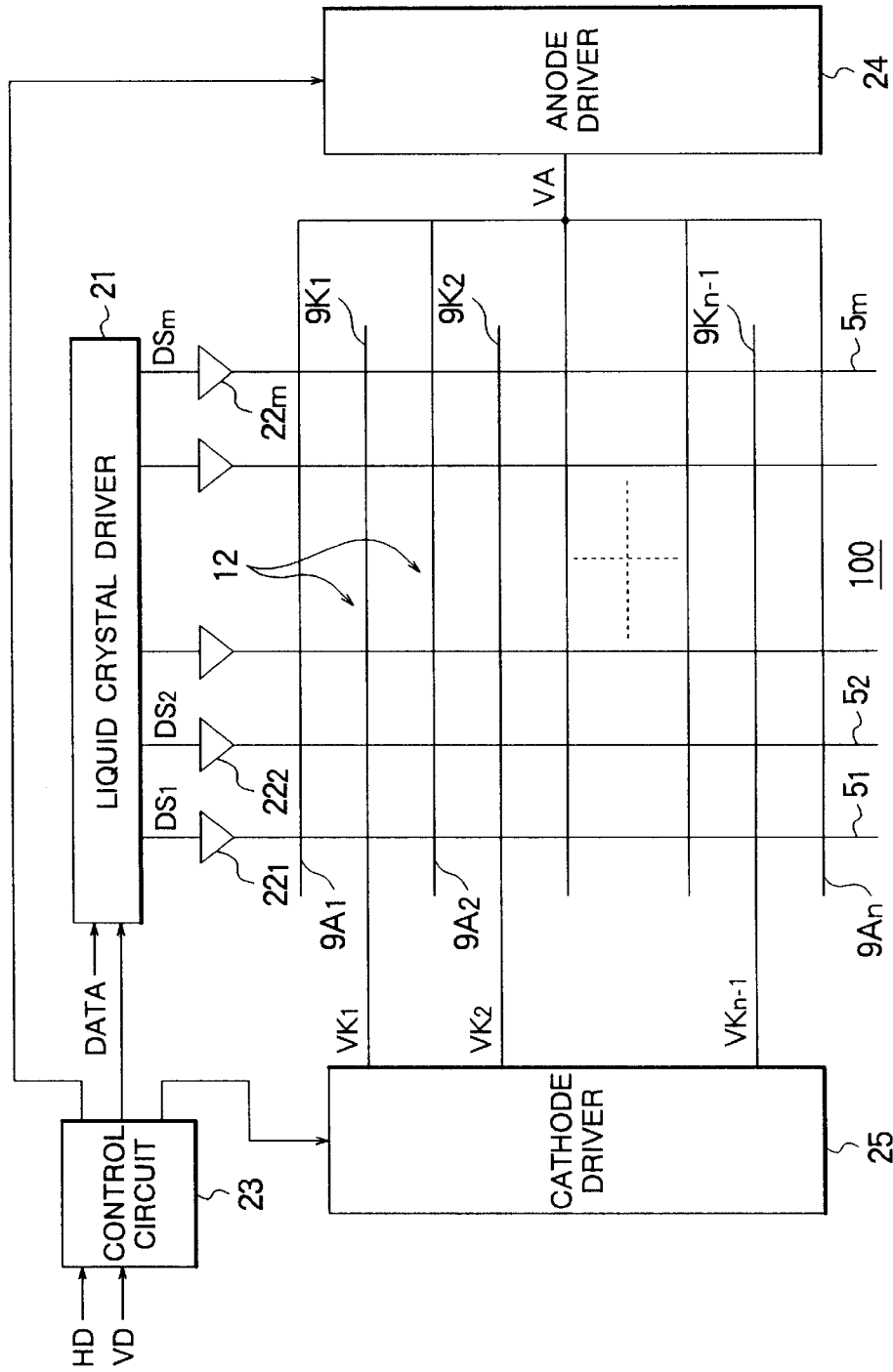
FIG. 3 is a view of the circuit configuration of a plasma addressed liquid crystal display device.

FIG. 1 is a schematic perspective view of principle parts showing an example of the configuration of the plasma addressed liquid crystal display device; FIG. 2 is a view of the arrangement of the data electrode, plasma electrode, and plasma chamber of a plasma addressed liquid crystal display device shown in FIG. 1; FIG. 3 is a view of the circuit configuration of a plasma addressed liquid crystal display device; and FIGS. 4A to 4E are waveform diagrams of the changes in the cathode voltage and data voltage.

As shown in FIG. 1, the plasma display device according to this embodiment is a plasma addressed liquid crystal display device 100 comprised of an electro-optical display cell 1, a plasma cell 2, and a dielectric sheet 3 interposed between the two forming a flat panel construction. The dielectric sheet 3 is comprised of a thin sheet of glass etc. The dielectric sheet 3 has to be made as thin as possible to drive the display cell 1 and is for example formed to a thickness of about 50 $\mu$m.

The display cell 1 is comprised using a top side transparent glass substrate (top substrate) 4. On the main surface on the inside of the top substrate 4 are formed, in parallel in the columnar direction (vertical direction) maintaining a predetermined distance, a plurality of data electrodes 5, comprised of a transparent electroconductive material and extending in the row direction (vertical direction). The top substrate 4 is bonded with the dielectric sheet 3 in the state with predetermined distance maintained between them by a spacer (not shown). In the space between the top substrate 4 and the dielectric sheet 3 is filled a liquid crystal as an electro-optical material to form the liquid crystal layer 7. Here, the dimensions of the distance between the top substrate 4 and the dielectric sheet 3 are made for example 4 to 10 $\mu$m which is maintained uniformly across the entire surface areas. Note that in this embodiment, use was made of a liquid electro-optical material, but in the plasma display device of the present invention, the electro-optical material need not necessarily be a liquid crystal and for example may be an electro-optical crystal plate.

On the other hand, the plasma cell 2 is comprised using the bottom side glass substrate (bottom substrate) 8. On the main surface of the inside of the bottom substrate 8 are alternately formed, in parallel in the row direction maintaining a predetermined distance, a plurality of anode electrodes 9A and cathode electrodes 9K constituting the plasma electrode and extending in the columnar direction. The width of an anode electrode 9A is 250 $\mu$m, while the width of a cathode electrode 9K is 130 $\mu$m. Further, the distance d between an anode electrode 9A and cathode electrode 9K is 150 $\mu$m.

Further, at the approximate center of each of the top surfaces of the anode electrodes 9A and cathode electrodes 9K is formed a barrier rib 10 of a predetermined width so as to extend along each of the electrodes. The top parts of the barrier ribs 10 abut against the bottom surface of the dielectric sheet 3 so that the dimensions of the distance between the bottom substrate 8 and the dielectric sheet 3 are maintained constant. The barrier rib 10 may be formed by for example repeatedly performing a thick screen printing.

At the periphery of the bottom substrate 8 along the periphery is arranged a frit sealing material (not shown) using a low melting point glass etc. for air-tightly bonding the bottom substrate 8 and the dielectric sheet 3. In the gap between the bottom substrate 8 and the dielectric sheet 3, a plurality of plasma chambers (spaces) 12 separated by the barrier ribs 10 and extending in the row direction are formed in parallel in the row direction. That is, the plasma chambers 12 are formed so as to intersect the data electrodes 5 perpendicularly. The discharge gas sealed in the plasma chambers 12 will be explained later.

At this time, the height of the plasma chamber 12 is 250 $\mu$m.

The data electrodes 5 shown in FIG. 1 are arranged in row driven units. Further, as mentioned later, the anode electrodes 9A are commonly connected and are supplied with an anode voltage, so the pair of plasma chambers 12 positioned at the two sides of each of the cathode electrodes 9K form row driven units. Further, a pixel 13 is defined as shown in FIG. 2 at each crossing point of the same.

In the above configuration, when a predetermined voltage is applied between the anode electrode 9A and cathode electrode 9K corresponding to a predetermined pair of plasma chambers 12, the gas in the portion of the pair of plasma chambers 12 is selectively ionized and plasma discharge occurs, so the inside is maintained substantially at the anode voltage. In this state, if data voltage is successively applied to the data electrodes 5, the data voltage will be written through the dielectric sheet 3 in the liquid crystal layer 7 of the plurality of pixels 13 arranged in the row direction corresponding to the pair of plasma chambers 12 in which the plasma discharge occurred. When the plasma discharge ends, the plasma chambers 12 become floating potentials and the data voltages written in the liquid crystal layer 7 of the pixels 13 are held until the next writing period (for example, after 1 frame) by the action of the dielectric sheet 3. In this case, the plasma chambers 12 function as sampling switches and the liquid crystal layer 7 and/or dielectric sheet 3 at the pixels 13 function as sampling capacitors.

Since the liquid crystal operates by the data voltage written in the liquid crystal layer 7 at each pixel 13, the display is carried out in pixel units. Accordingly, as mentioned above, by causing a plasma discharge and successively scanning in the row direction the pairs of plasma chambers 12 for writing data voltage in the liquid crystal layer 7 of the plurality of pixels 13 arranged in the column direction, the display of two-dimensional images becomes possible.

FIG. 3 shows the circuit configuration of the above-mentioned plasma addressed liquid crystal display device 100. In FIG. 3, portions corresponding to FIG. 1 and FIG. 2 are shown with the same references. Reference numeral 21 is a liquid crystal driver, which liquid crystal driver 21 is supplied with video data (DATA). From the liquid crystal driver 21, data voltages $DS_1$ to $DS_m$ of a plurality of pixels constituting a line are simultaneously output for each horizontal period. The data voltages $DS_1$ to $DS_m$ of a plurality of pixels are supplied to the plurality of data electrodes $5_1$ to $5_m$ through the buffers $22_1$ to $22_m$.

Note that the operation of the liquid crystal driver 21 is controlled by the control circuit 23. The control circuit 23 is supplied with the horizontal synchronization signal HD and the vertical synchronization signal VD corresponding to the video data (DATA) as the synchronization reference signals. Further, the control circuit 23 controls the operation of the later mentioned anode driver 24 and cathode driver 25.

Reference numeral 24 is an anode driver. From this anode driver 24 is supplied the anode voltage VA as a reference voltage to the plurality of commonly connected anode electrodes $9A_1$ to $9A_n$. Further, reference numeral 25 is a cathode driver. Each horizontal period, cathode voltages $VK_1$ to $VK_{n-1}$ of a predetermined potential difference from the potential are successively supplied to the plurality of cathode electrodes $9K_1$ to $9K_{n-1}$ from the cathode driver 25. Due to this, each horizontal period, a plasma discharge successively occurs in the pairs of plasma chambers 12 corresponding to the cathode electrodes $9K_1$ to $9K_{n-1}$, therefore the pairs of plasma chambers 12 writing the data voltages $DS_1$ to $DS_m$ in the liquid crystal layer 7 at the plurality of pixels 13 arranged in the columnar direction (horizontal direction) are successively scanned in the row direction (vertical direction).

Figure 4:
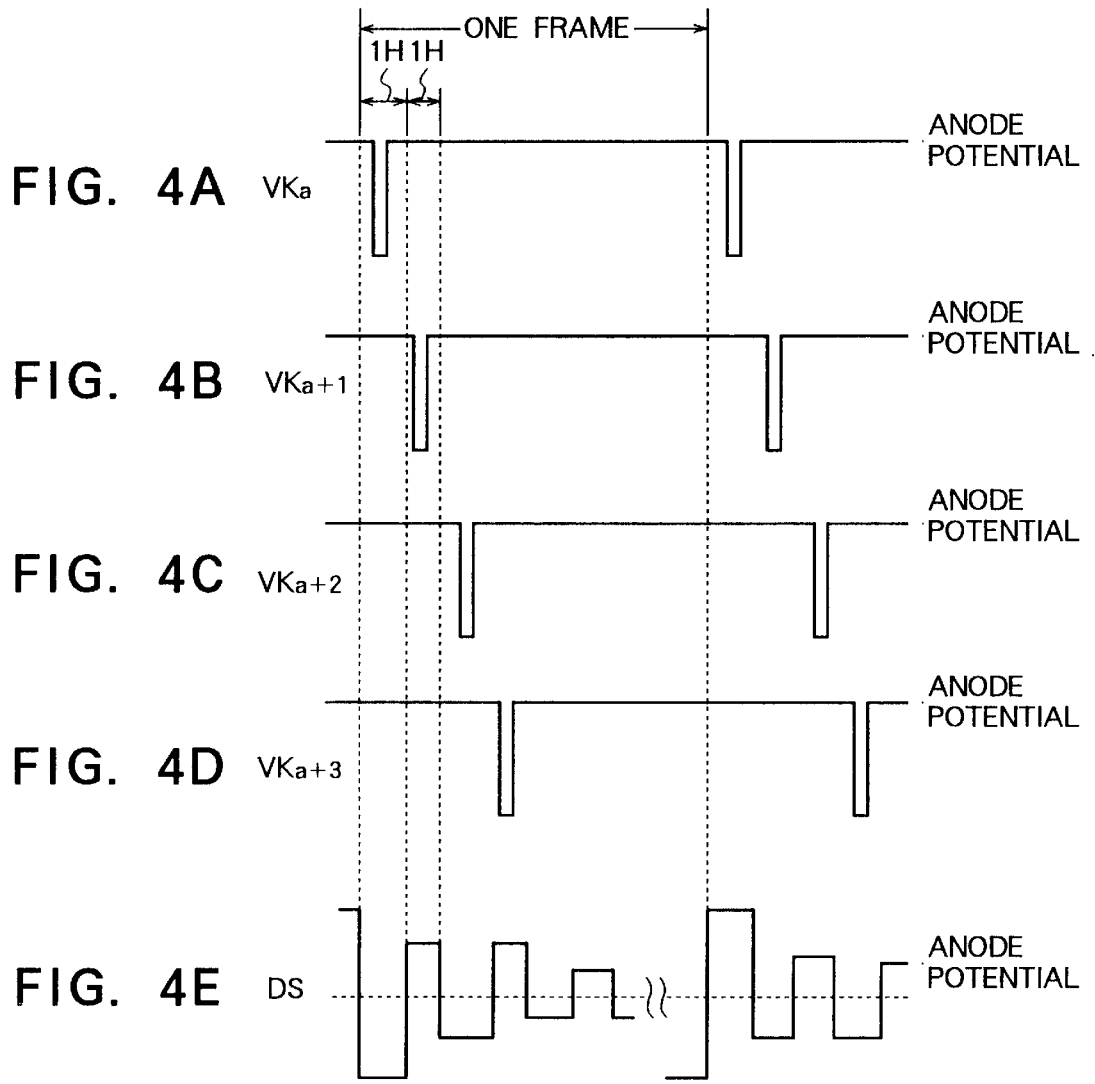
FIGS. 4A to 4E are waveform diagrams of the changes in the cathode voltage and data voltage.

Here, an explanation will be made of the cathode voltage applied to the cathode electrode 9K and the data voltage DS applied to the data electrode 5. FIGS. 4A to 4D show the cathode voltages $VK_a$ to $VK_{a+3}$ applied to the successive cathode electrodes $9K_a$ to $9K_{a+3}$, while FIG. 4E shows the data voltage DS applied to the predetermined data electrode 5. To the cathode electrodes $9K_a$ to $9K_{a+3}$ are supplied the cathode voltages $VK_a$ to $VK_{a+3}$ having the predetermined potential differences from the anode potential in the successive horizontal periods (1H) for each frame. Due to this, the plasma chambers 12 for generating the plasma discharge are successively scanned in the row direction (vertical direction). The pulse width of the cathode voltages $VK_a$ to $VK_{a+}$ is 10 μs and the period is 33 μs.

Further, the data voltage DS is inverted in polarity with respect to the anode potential every horizontal period and every frame so that the liquid crystal layer 7 is driven alternately. The liquid crystal display layer 7 is driven alternately to prevent deterioration of the liquid crystal.

The plasma addressed liquid crystal display device shown below has the same configuration as the above-mentioned plasma addressed liquid crystal display device 100 and has as its characterizing feature the discharge gas.

First Embodiment

Figure 5:
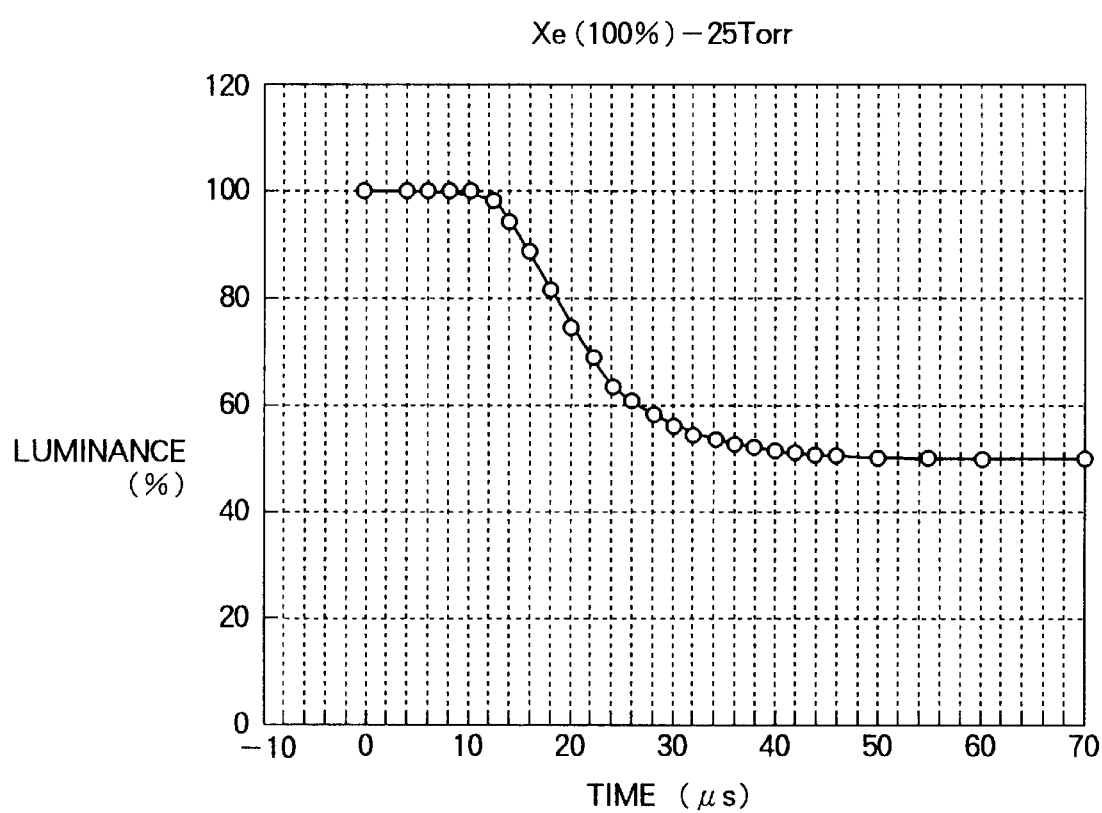
FIG. 5 is a view for explaining the plasma decay time of a plasma addressed liquid crystal display device according to a first embodiment of the present invention.

FIG. 5 is a view for explaining the plasma decay time of the plasma addressed liquid crystal display device of this embodiment, where the horizontal axis shows the time (μs) and the vertical axis shows the luminance (%).

In this embodiment, in the plasma chamber 12 shown in FIG. 1, as the discharge gas, approximately 100 percent by volume of xenon (Xe) gas is sealed at a pressure of 3333 Pa (25 Torr).

Further, the discharge pulse voltage is 340 V and the discharge pulse current is 50 mA.

The discharge pulse voltage means the amplitude of the cathode potential with respect to the anode potential. Further, the discharge pulse current means the current flowing through the plasma chamber 12 in the discharge state.

As shown in FIG. 5, in the plasma addressed liquid crystal display device, the plasma decay time is approximately 30 μs. As opposed to this, when approximately 100 percent by volume of helium (He) gas is sealed in the plasma chamber 12 at a pressure of $1.6 \times 10^4$ Pa (120 Torr), the plasma decay time is 50 μs. Here, the plasma decay time means the time from the end of the discharge to when there is no longer an effect on the liquid crystal display.

In this way, in the plasma addressed liquid crystal display device of this embodiment, by using approximately 100 percent by volume of xenon as the discharge gas, it is possible to greatly shorten the plasma decay time and obtain the superior display properties compared with the case of using approximately 100 percent by volume of helium.

This is due to the fact that xenon, compared with helium, has a shorter time until extinction of metastable particles.

Further, the maximum contrast when combining the plasma chamber 12 having the properties shown in FIG. 5 with TN (twisted nematic) liquid crystal is at least 150.

In this embodiment, the product P·d between the pressure P of the discharge gas and the distance d between electrodes becomes approximately 0.5 Pa·m (3333 Pa×150 μm).

At this time, if the pressure P of the discharge gas is made about 2×10⁴ Pa (150 Torr) or so, it has been experimentally confirmed that the spread of the discharge in the plasma chamber 12 becomes poor and the state of discharge becomes unstable. That is, P·d should be not more than 3.0 Pa·m (20,000 Pa×150 $\mu$m).

Further, if P·d is made less than 0.2, a discharge pulse voltage of over about 500 V will become required for causing a suitable discharge in the plasma chamber 12 and the new problem will arise of the voltage resistance of the drive IC etc.

Accordingly, in the plasma addressed liquid crystal display device, when using 100 percent by volume of xenon gas as the discharge gas, P·d has to be set in the range of 0.2≦P·d≦3.0 (Pa·m).

The properties of the discharge gas are defined in this way using the P·d because under the Paschen rule, the discharge starting voltage becomes a function of P·d.

Figure 6:
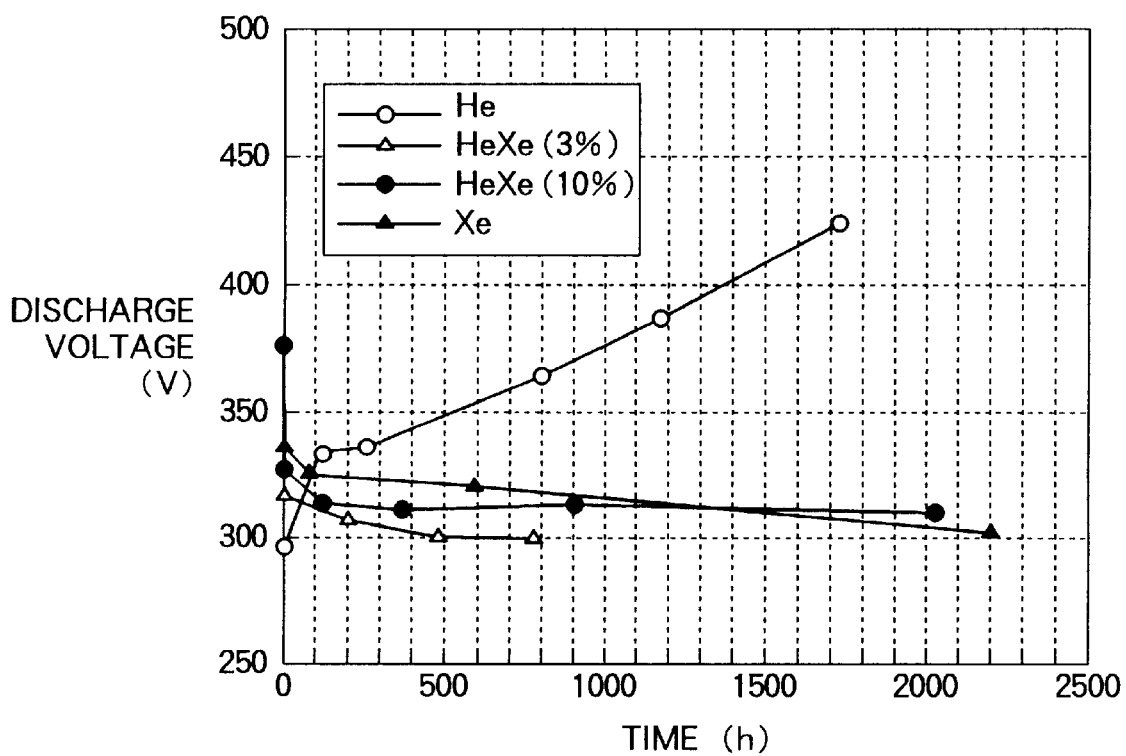
FIG. 6 is a view of changes along with time of the discharge voltage in a plasma addressed liquid crystal display device of the first embodiment of the present invention, wherein the horizontal axis shows the time (hours) and the vertical axis shows the discharge voltage (V)

FIG. 6 is a view of a changes along with time in the plasma addressed liquid crystal display device of this embodiment, where the horizontal axis shows the time (hours) and the vertical axis the discharge voltage (V).

FIG. 6 shows the case of use as the discharge gas of about 100 percent by volume of helium gas, the case of use of a mixed gas of about 3 percent by volume of xenon gas and about 97 percent by volume of helium gas, the case of use of a mixed gas of about 10 percent by volume of xenon gas and about 90 percent by volume of helium gas, and the case of use of about 100 percent by volume of xenon gas.

From FIG. 6, it is understood that in the case of sealing into the plasma chamber 12 approximately 100 percent by volume of xenon gas or a mixed gas of helium gas and xenon gas, the changes along with time of the discharge voltage are greatly suppressed compared with when sealing approximately 100 percent by volume of helium gas.

Figure 7:
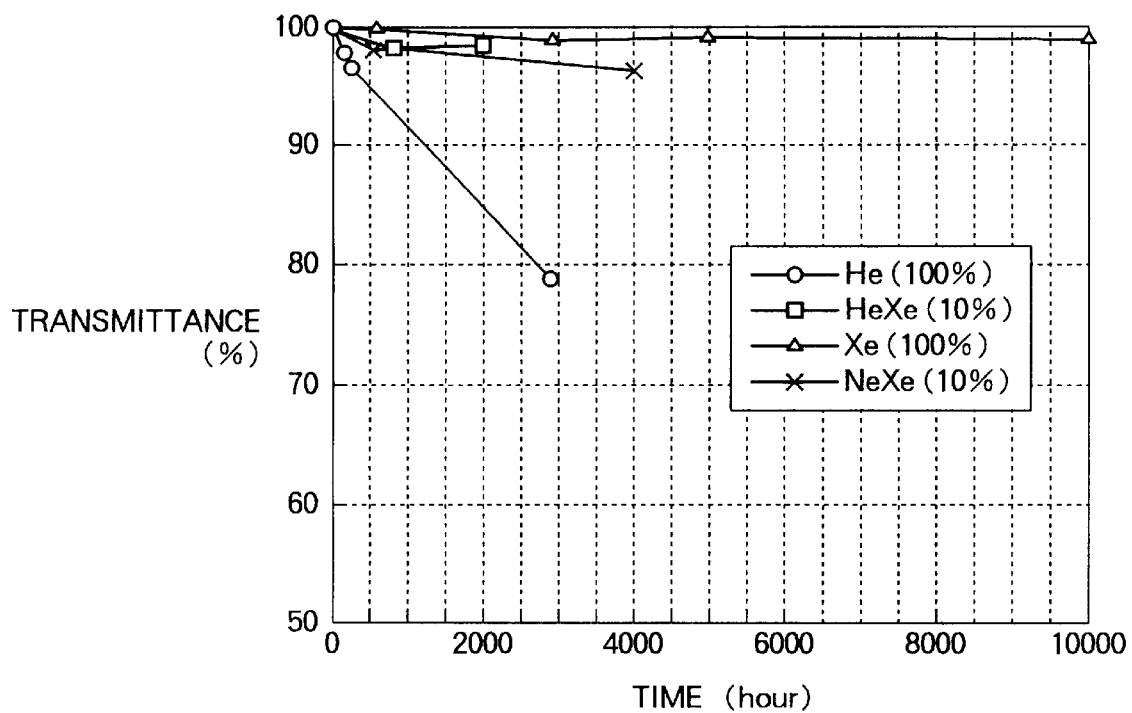
FIG. 7 is a view of the changes along with time of the transmittance in a plasma addressed liquid crystal display device of the first embodiment of the present invention, wherein the horizontal axis shows the time (hours) and the vertical axis the transmittance (%)

FIG. 7 is a view of the changes along with time in the transmittance in a plasma addressed liquid crystal display device of this embodiment, wherein the horizontal axis shows the time (hours) and the vertical axis the transmittance (%).

FIG. 7 shows the case of use as the discharge gas of about 100 percent by volume of helium gas, the case of use of a mixed gas of about 10 percent by volume of xenon gas and about 90 percent by volume of helium gas, the case of use of about 100 percent by volume of xenon gas, and the case of use of a mixed gas of about 10 percent by volume of xenon gas and about 90 percent by volume of neon gas.

From FIG. 7, it is understood that in the case of sealing into the plasma chamber 12 approximately 100 percent by volume of xenon gas or a mixed gas of helium gas and xenon gas, the changes along with time of the transmittance are greatly suppressed compared with when sealing approximately 100 percent by volume of helium gas.

Further, it was confirmed that when using 100 percent by volume of xenon gas as the discharge gas, the deterioration of the transmittance was less than 2 percent in 1000 hours and the panel life was extremely long. As opposed to this, in the case of use of 100 percent by volume of helium gas as the discharge gas, the deterioration of the transmittance within 1000 hours was about 70 percent.

Further, when using as the discharge gas a mixed gas comprising a mixture of the xenon gas with helium gas or neon gas or other inert gas or other stable gas, in addition to the case shown in FIG. 6 and FIG. 7, it was confirmed experimentally that at a wide ratio of mixture of approximately 5 to approximately 100 percent by volume for the concentration of the xenon gas, the plasma addressed liquid crystal display device operates well.

However, if the partial pressure of the xenon gas falls, the plasma decay time will become longer, so in the plasma addressed liquid crystal display device of this embodiment, when using as the discharge gas a mixed gas comprised of xenon gas and helium gas or neon gas or other inert gas or other stable gas, P·d is set to a range of 0.02≦P·d≦3.0 (Pa·m). Here, P shows the partial pressure of xenon contained in the discharge gas.

That is, the upper limit of P·d, as mentioned above, is set to 3.0 since if the partial pressure P of the xenon included in the discharge gas is made 2×10⁴ Pa (150 Torr), the spread of the discharge in the plasma chamber 12 will become poor and the state of discharge will become unstable—as confirmed experimentally.

Further, in the case of use of such a mixed gas, if P·d is less than 0.02, the plasma decay time becomes longer than 50 $\mu$s, so the lower limit on the P·d is 0.02.

However, with images of the multiple speed NTSC system, the allocation time for one line (selection time) is about 30 $\mu$sec. Further, in the high definition system, it becomes a shorter approximately 15 $\mu$sec. In the multiple speed NTSC system, the discharge time is about 10 $\mu$sec. The maximum data hold time becomes 20 $\mu$sec. In the case of a comparative example of use of 100 percent by volume of helium gas as the discharge case, until the next line selection, the metastable particles remain and there is a risk of mistaken writing of data. As opposed to this, in this embodiment, using as the discharge gas 100 percent by volume of xenon gas or krypton gas or a mixed gas of helium and xenon gas and/or krypton gas, it is possible to prevent mistaken writing of data at the time of the next line selection and, even with a multiple speed NTSC display, enough contrast of the device can be obtained. A similar effect to this can be obtained even in the case of application of the present invention to an XGA, SXGA, high definition system, or other high resolution display.

As explained above, according to the plasma addressed liquid crystal display device of the present embodiment, it is possible to shorten the plasma decay time and to obtain superior display properties.

Further, according to the plasma addressed liquid crystal display device of the present embodiment, the changes along with time of the transmittance, discharge voltage, and operating current can be suppressed over a long period and the panel life made longer. As a result, the discharge state stabilizers, there is little unevenness of image, and a good image can be provided over a long period of time.

Further, according to the plasma addressed liquid crystal display device of this embodiment, there is no problem of scattering of transmission to the glass as in the case of use of helium as the discharge gas.

Second Embodiment

Figure 8:
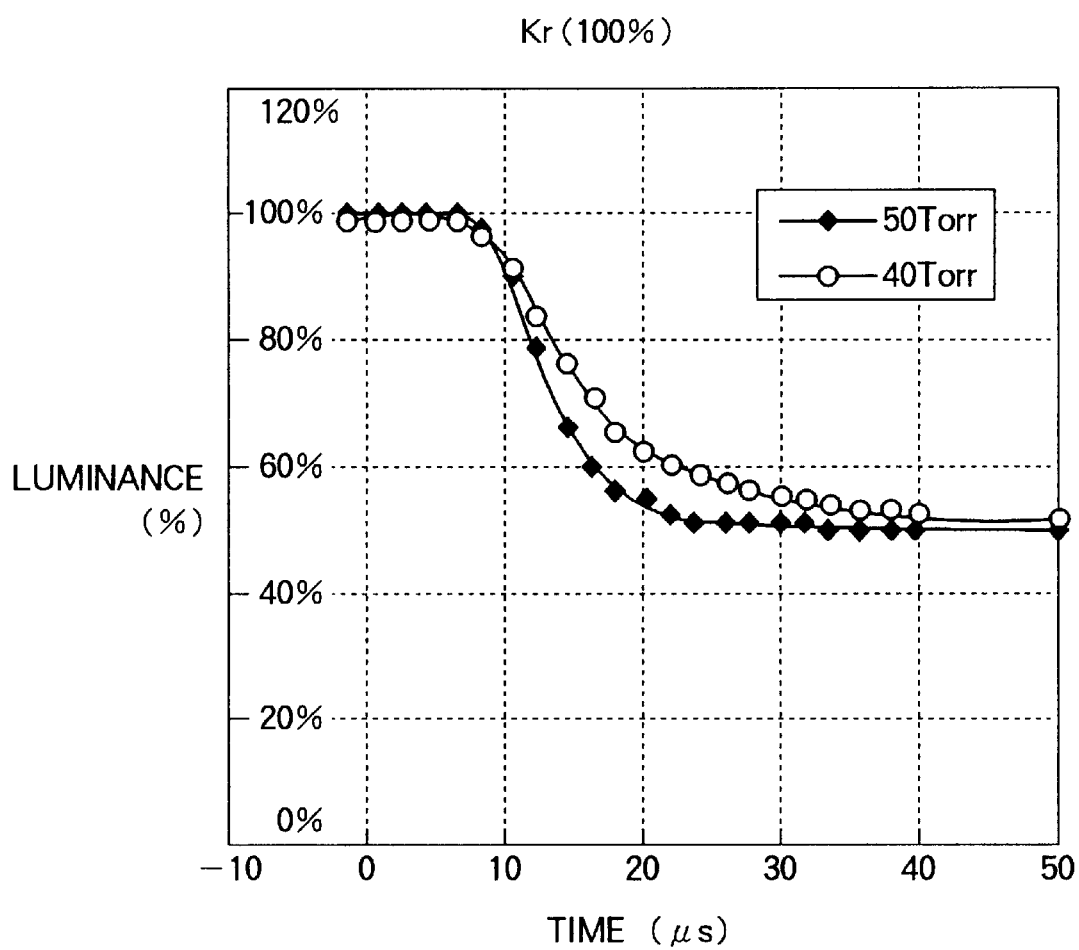
FIG. 8 is a view for explaining the plasma decay time of a plasma addressed liquid crystal display device according to a second embodiment of the present invention, wherein the horizontal axis shows the time ($\mu$s) and the vertical axis shows the luminance (%)

FIG. 8 is a view for explaining the plasma decay time of a plasma addressed liquid crystal display device according to this embodiment, wherein the horizontal axis shows the time ($\mu$s) and the vertical axis shows the luminance (%).

In this embodiment, in the plasma chamber 12 shown in FIG. 1, as the discharge gas, approximately 100 percent by volume of krypton gas (Kr) is sealed at a pressure of 5333 Pa (40 Torr) and 6666 Pa (50 Torr).

The discharge pulse voltage is about 300 V and the discharge pulse current is about 90 mA.

As shown in FIG. 8, the plasma decay time is about 25 $\mu$s in the case of a pressure of 5333 Pa (40 Torr) and about 20 $\mu$s in the case of a pressure of 6666 Pa (50 Torr).

As a result, as mentioned above, in the same way as when using as the discharge gas 100 percent by volume of xenon gas, the plasma decay time becomes shorter compared with the case of using as the discharge gas 100 percent by volume of helium gas.

Further, it was confirmed that there was almost no change in the discharge voltage and transmittance within 10,000 hours and the panel life became extremely long.

Krypton gas, like xenon gas, has a smaller discharge current, less sputter, a shorter decay time, and a smaller light emission in the visible range compared with helium gas.

Figure 9:
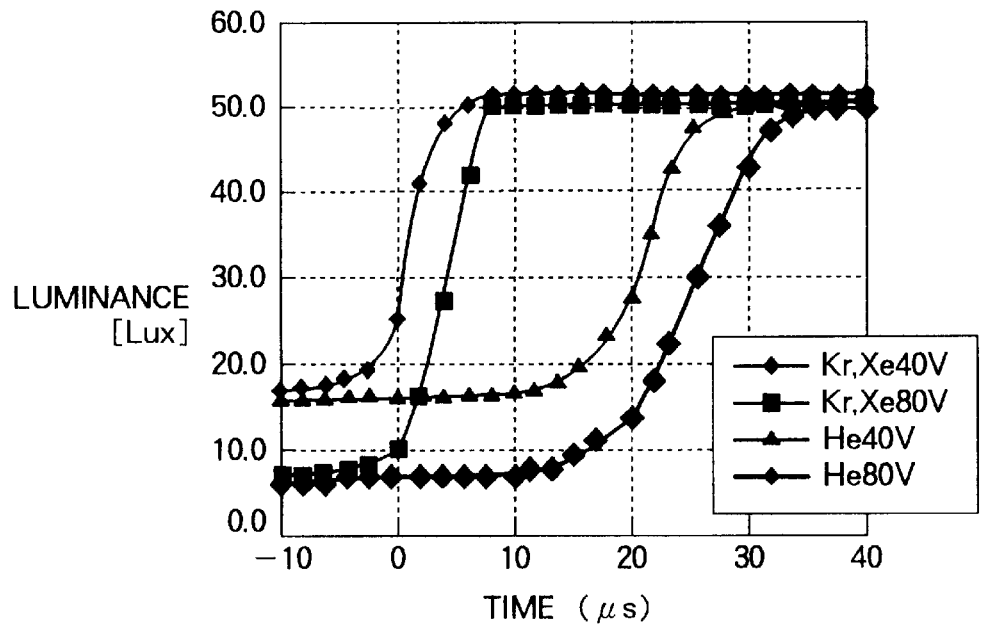
FIG. 9 is a view for explaining the similar properties of xenon gas and krypton gas.

FIG. 9 is a view of a plasma decay time curve in a write operation in the case of use of pure xenon, krypton, and helium gas as the discharge gas.

FIG. 9 shows the case of when applying data voltages of 40 V and 80 V to the pure gases of krypton and xenon and the case of applying data voltages of 40 V and 80 V to a pure gas of helium.

Figure 10:
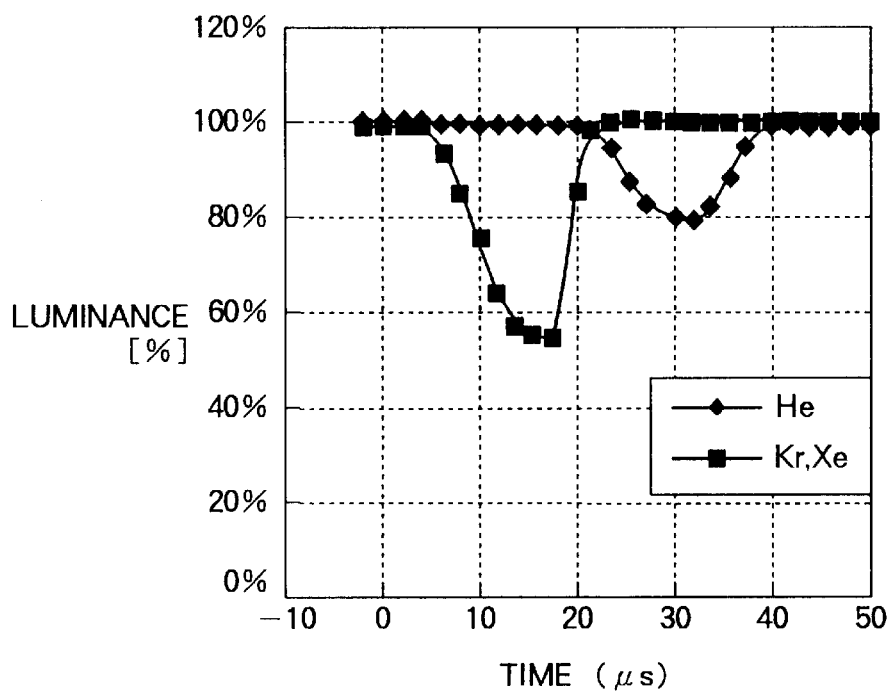
FIG. 10 is a view for explaining the similar properties of xenon gas and krypton gas.

FIG. 10 is a view of a plasma decay time curve in a write-erase operation in the case of using as the discharge gas a pure gas of xenon, krypton, and helium.

In FIG. 9, the discharge is performed in the period of the time −10 to 0 $\mu$s. With pure gas of krypton and xenon, the amount of writing (luminance) changes before the time 0 $\mu$s during the discharge.

Due to these properties, in the curve of the plasma decay time in a write-erase operation shown in FIG. 10, xenon and krypton have shorter plasma decay times compared with helium and the luminance changes discontinuously slightly before the time 20 $\mu$s—which is the end point of the data pulse.

These properties shown in FIG. 9 and FIG. 10 are characteristic of xenon and krypton and are not seen with neon and argon.

Further, experimentally, if 100 percent by volume of krypton gas is used as the discharge gas as in this embodiment, in the same way as the previous first embodiment, it is necessary to set P·d in the range of $0.2 \leq P \cdot d \leq 3.0$ (Pa·m).

That is, if the pressure P of the discharge gas is made $2 \times 10^4$ Pa (150 Torr), it was confirmed experimentally that the spread of the discharge in the plasma chamber will become poor and the state of discharge will become unstable. That is, P·d should be made not more than 3.0 (Pa·m)(20000 Pa×150 $\mu$m).

Further, if P·d is less than 0.2, a discharge pulse voltage of over about 500 V will be required for generating a suitable discharge in the plasma chamber 12 and a new problem will end up arising of the voltage resistance of the drive IC.

Further, when using as the discharge gas a mixed gas comprising a mixture with the krypton gas of helium gas or neon gas or other inert gas or other stable gas, it was confirmed experimentally that at a wide ratio of mixture of approximately 5 to approximately 100 percent by volume for the concentration of the krypton gas, the plasma addressed liquid crystal display device operates well.

However, if the partial pressure of the krypton gas falls, the plasma decay time will become longer, so in the plasma addressed liquid crystal display device of this embodiment, when using as the discharge gas a mixed gas comprised of krypton gas and helium gas or neon gas or other inert gas or other stable gas, P·d is set to a range of $0.02 \leq P \cdot d \leq 3.0$ (Pa·m). Here, P shows the partial pressure of krypton contained in the discharge gas.

That is, the upper limit of P·d, as mentioned above, is set to 3.0 since if the partial pressure P of the krypton included in the discharge gas is made $2 \times 10^4$ Pa (150 Torr), the spread of the discharge in the plasma chamber 12 will become poor and the state of discharge will become unstable—as confirmed experimentally.

Further, in the case of use of such a mixed gas, if P·d is less than 0.02, the plasma decay time becomes longer than 50 $\mu$s, so the lower limit on the P·d is 0.02.

As explained above, even with the plasma addressed liquid crystal display device of this embodiment, similar effects can be obtained as with the plasma addressed liquid crystal display device of the first embodiment.

Note that the present invention is not limited to the above embodiments and may be modified in various ways within the scope of the invention.

For example, the configuration of the cathode electrodes and anode electrodes of the plasma addressed liquid crystal display device is not limited to those of the above embodiments and can be modified in various ways. For example, when an alternating current is passed, either of the electrodes may be buried in the dielectric layer and need not be directly exposed inside the plasma chamber.

As explained above, according to the plasma addressed electro-optical display device of the present invention, it is possible to shorten the plasma decay time and to exhibit superior display characteristics.

Further, according to the plasma addressed electro-optical display device of the present invention, the changes along with time of the transmittance, discharge voltage, and operating current can be suppressed over a long period and the lifetime of the panel is longer. As a result, the state of discharge becomes stable, there is little unevenness in the image, and a good quality image can be provided over a long period of time.

What is claimed is:

1. A plasma addressed electro-optical display device comprising:

a first substrate having a plurality of first electrodes provided on a transparent electrode;

a second substrate having a plurality of second electrodes extending perpendicularly to said first electrodes and disposed with the second electrodes facing the first electrodes;

a third substrate provided between the first and second substrates;

an electro-optical layer provided between a potential setting sheet and the second substrate;

a plasma cell formed between the electro-optical layer and said first substrate; and an ionizable gas sealed in the discharge space, said ionizable gas comprising 100 percent by volume of xenon.

2. A plasma addressed electro-optical display device as set forth in claim 1, wherein when the pressure of the ionizable gas is P and the distance between the adjoining discharge electrodes is d, the following expression is satisfied:

$$0.2 \leq P \cdot d \leq 3.0 (Pa \cdot m).$$

3. A plasma addressed electro-optical display device comprising:

a first substrate having a plurality of first electrodes provided on a transparent electrode;

a second substrate having a plurality of second electrodes extending perpendicularly to said first electrodes and disposed with the second electrodes facing the first electrodes;

a third substrate provided between the first and second substrates;

an electro-optical layer provided between a potential setting sheet and the second substrate;

a plasma cell formed between the electro-optical layer and said first substrate; and an ionizable gas sealed in the discharge space, said ionizable gas comprising xenon and an inert gas or a stable gas, wherein when the pressure of the xenon is P and the distance between the adjoining discharge electrodes is d, the following expression is satisfied:

$$0.02 \leq P \cdot d \leq 3.0 (Pa \cdot m).$$

4. A plasma addressed electro-optical display device comprising:

a first substrate having a plurality of first electrodes provided on a transparent electrode;

a second substrate having a plurality of second electrodes extending perpendicularly to said first electrodes and disposed with the second electrodes facing the first electrodes;

a third substrate provided between the first and second substrates;

an electro-optical layer provided between a potential setting sheet and the second substrate;

a plasma cell formed between the electro-optical layer and said first substrate; and an ionizable gas sealed in the discharge space, said ionizable gas comprising 100 percent by volume of krypton.

5. A plasma addressed electro-optical display device as set forth in claim 4, wherein when the pressure of the krypton is P and the distance between the adjoining discharge electrodes is d, the following expression is satisfied:

$$0.2 \leq P \cdot d \leq 3.0 (Pa \cdot m).$$

6. A plasma addressed electro-optical display device comprising:

a first substrate having a plurality of first electrodes provided on a transparent electrode;

a second substrate having a plurality of second electrodes extending perpendicularly to said first electrodes and disposed with the second electrodes facing the first electrodes;

a third substrate provided between the first and second substrates;

an electro-optical layer provided between a potential setting sheet and the second substrate;

a plasma cell formed between the electro-optical layer and said first substrate; and an ionizable gas sealed in the discharge space, said ionizable gas comprising krypton and an inert gas or a stable gas, wherein when the pressure of the krypton is P and the distance between the adjoining discharge electrodes is d, the following expression is satisfied:

$$0.02 \leq P \cdot d \leq 3.0 (Pa \cdot m).$$

* * * * *